Jan. 16, 1962   J. B. SMITH   3,017,204
SPLIT COUPLING
Filed Jan. 12, 1959   4 Sheets-Sheet 4
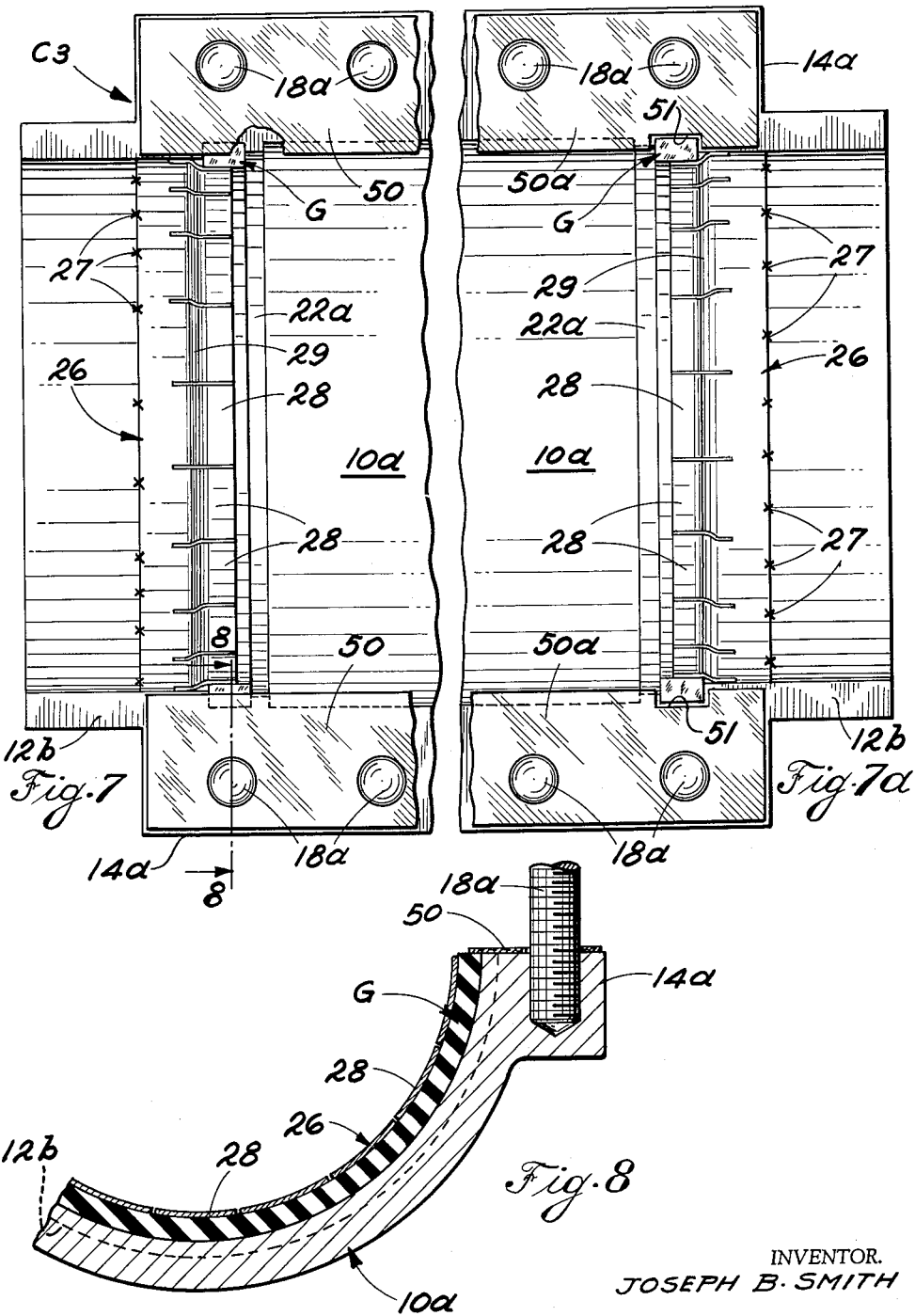
INVENTOR.
JOSEPH B. SMITH
BY
RICHEY, McNENNY & FARRINGTON
ATTORNEYS

United States Patent Office 3,017,204
Patented Jan. 16, 1962

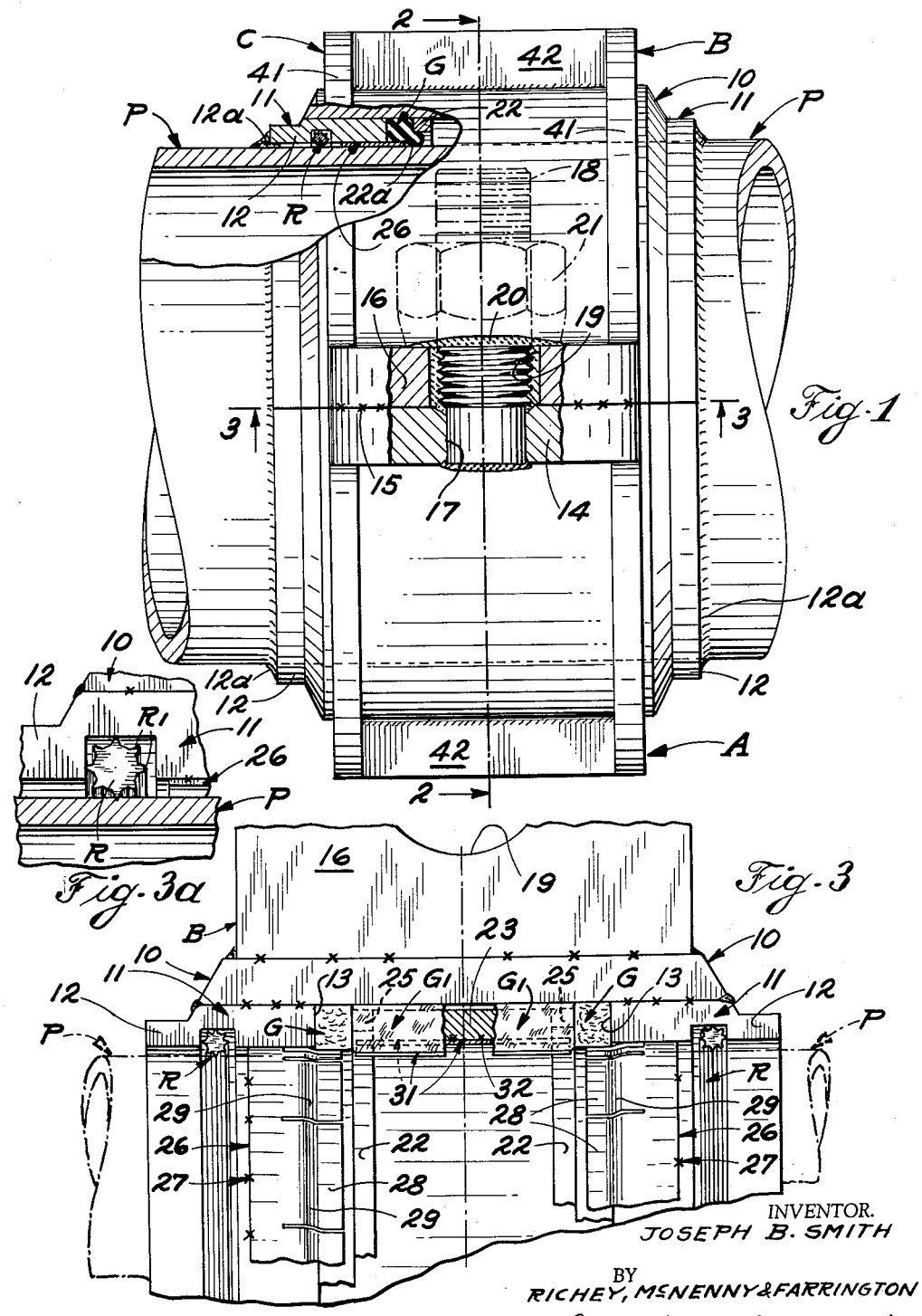

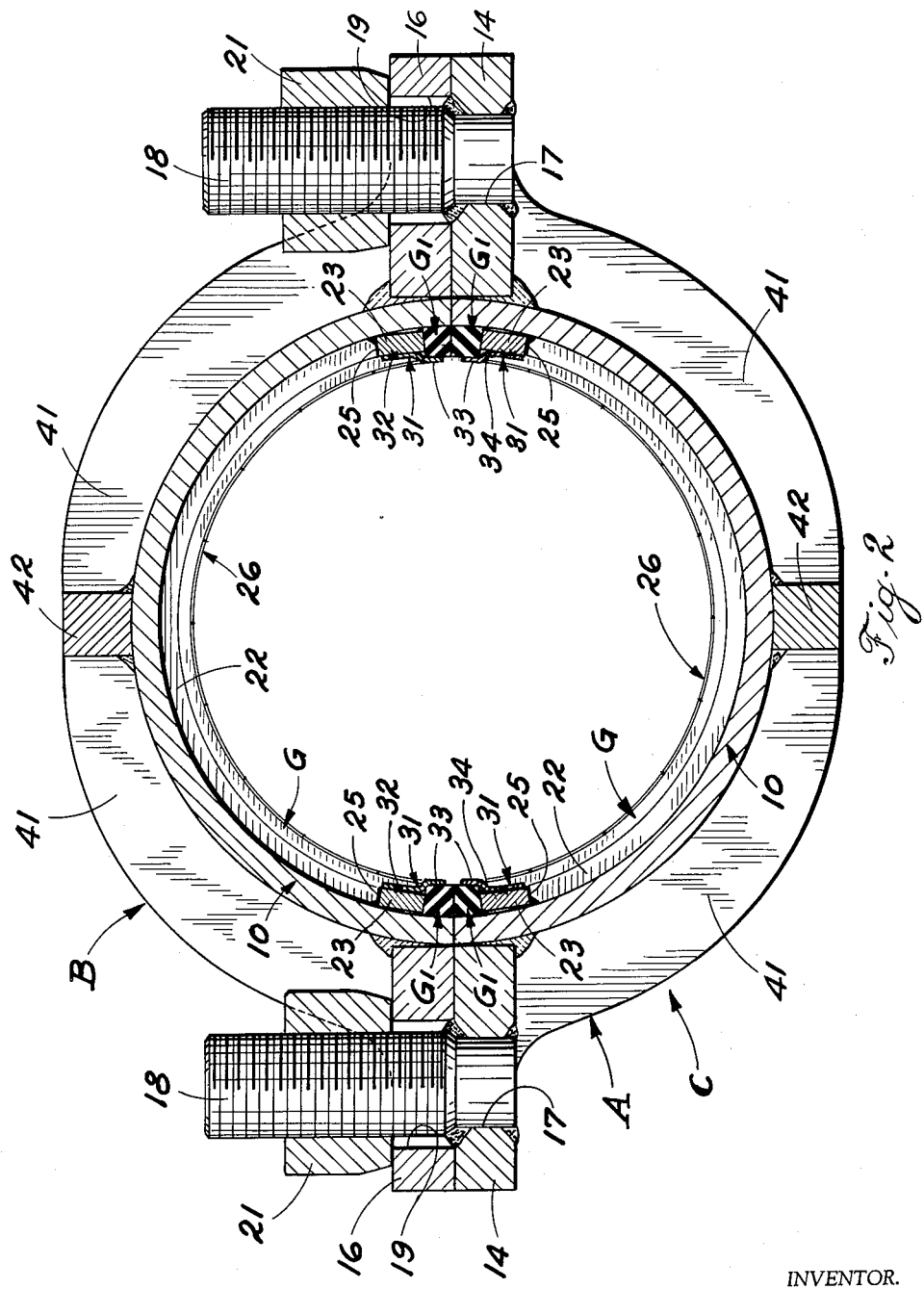

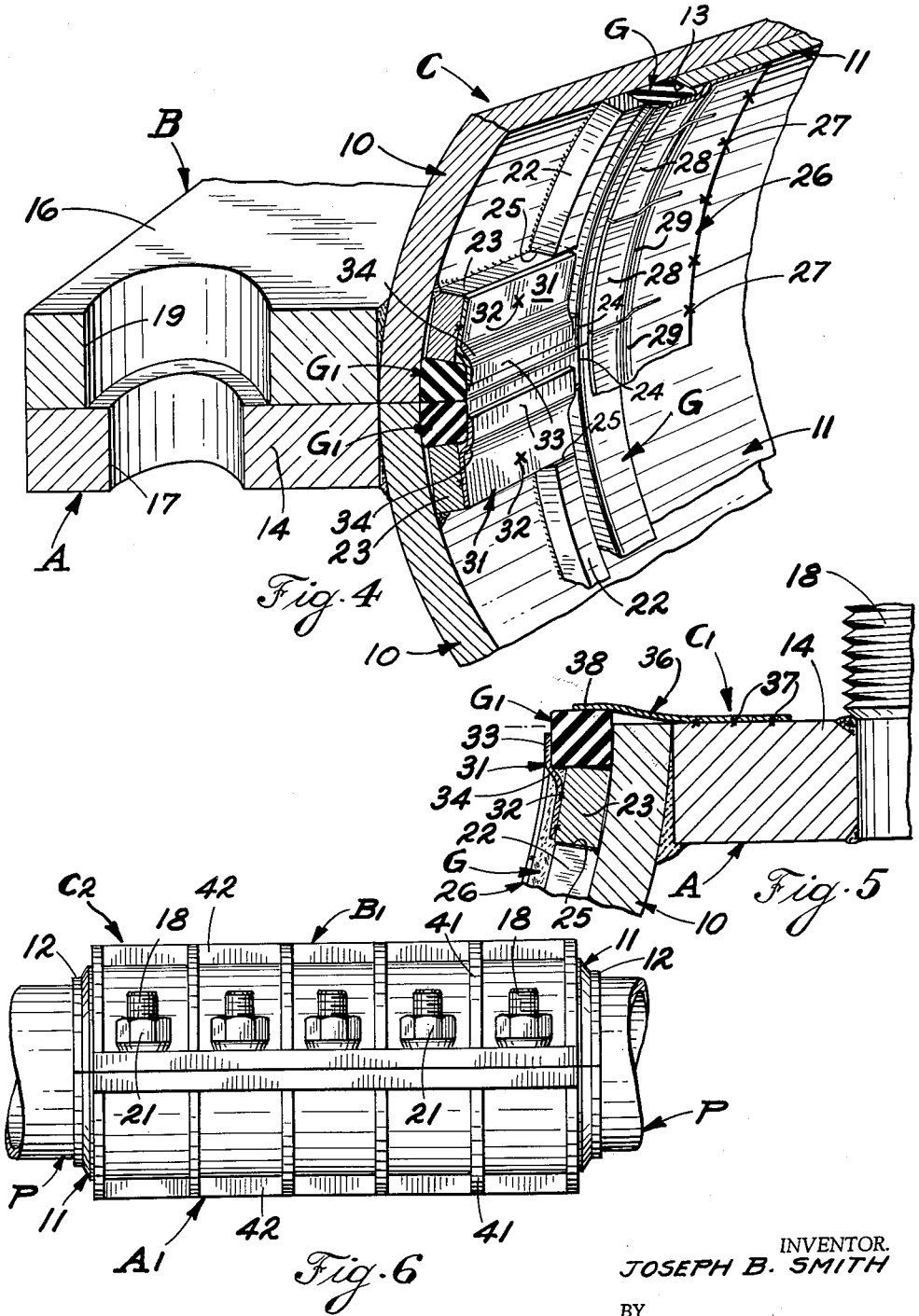

3,017,204
SPLIT COUPLING
Joseph B. Smith, Berea, Ohio
(5700 Detroit Ave., Cleveland 2, Ohio)
Filed Jan. 12, 1959, Ser. No. 786,391
4 Claims. (Cl. 285—373)

This invention relates to pipe couplings for sealing off leaks in pipes or pipe lines, or for joining together and sealing the ends of two pipes.

According to the present invention, I provide two semi-cylindrical body members with means to join the body members together to form a cylindrical coupling member that surrounds a pipe. Each coupling member has formed adjacent its ends a recess that receives a circumferential gasket or packing member. In addition, along the axial edges of each member at their interface is an axial gasket backed up by an axial thrust bar welded to or otherwise formed integral with the body of the member. When these coupling members or halves are assembled on a leaky pipe, the circumferential gaskets prevent, and seal against, flow axially past the pipe coupling. The opposed pairs of axial gaskets provide a seal against escape of fluid radially between the coupling parts.

According to this invention, the gaskets are so mounted that they will not be scraped out of place during assembly or blown out of place by fluid that might be issuing from a leak in the pipe, although in many cases such fluid emerges at high velocity because of high pressure in the pipe. Also, the manner in which the circumferential packings are mounted is such that the intermediate length of the coupling body is radially spaced from the pipe after installation, thereby accommodating welds or other roughness on the exterior of the pipe.

It is a feature of the preferred embodiment of the invention that what I call "girdering" is provided for the circumferential gaskets. This girdering is in the form of a series of thin, flexible metal plates that are attached to the end portions of the coupling and extend axially so as to partially, but not completely, axially overlap the circumferential gaskets. The gaskets are made somewhat radially thicker than the depth of the recesses in which they fit, so that when the coupling parts are clamped together the gaskets are firmly pressed against the pipe walls to produce a circumferential seal. This operation is augmented by the girdering because the latter still further confines the packing and as the girdering engages the pipe wall it is bent inwardly, displacing the gasket material and forcing it to flow outwardly through the narrower uncovered zone of the gasket, and so insures complete sealing engagement of the gasket with the pipe wall in the zone between the ends of the girdering and the opposite wall of the gasket retaining recess. At the same time, the flexible girdering strips have their axially outer ends secured to the body so as to trap the gasket material and prevent it being extruded out by fluid pressure within the coupling.

I also contemplate the provision of axially extending, flexible girdering mounted on the axial thrust or gasket back-up bars that partially cover the inner faces of the associated axial gaskets. This provides additional insurance that the axial gaskets will not become dislodged during assembly of the coupling with a pipe or by fluid emerging from a leak. This girdering may also engage the wall of the pipe when the coupling is tightened down, displacing and flowing the axial gaskets into firm sealing engagement at their meeting faces.

The axial gasket in each coupling half extends past the mating interfaces to insure compression of the gaskets and a good seal when the coupling parts are clamped together. In one embodiment of the invention I provide axial girdering that extends along the exposed outer faces of the axial gaskets but does not completely cover them which, when the coupling members are brought together, engages the corresponding girdering on the other coupling half, causing both to be bent inwardly and displace the gasket material outwardly through the relatively narrow exposed zones, insuring complete sealing and also trapping the axial gasket material against extrusion out through the joint between the coupling halves from fluid pressure. In addition, this latter girdering, when used with the previously described axial girdering, make it virtually impossible to displace or dislodge the axial gaskets before the pipe members are completely assembled.

In the drawings:

FIG. 1 is a side view of a coupling embodying the invention installed on, and also welded to, a pipe;

FIG. 2 is a section taken on 2—2 of FIG. 1 with the pipe omitted to show the position that the gasket parts tend to assume when uncompressed;

FIG. 3 is a plan view of the upper half of the coupling as indicated at 3—3 of FIG. 1, a pipe being indicated in dot-dash lines;

FIG. 3a is an enlarged fragmentary section showing a pipe gripping ring.

FIG. 4 is a fragmentary perspective view of one end of an assembled coupling with the pipe omitted for clarity (the clamp bolt is not shown in this view);

FIG. 5 is a fragmentary section of one-half of the coupling of a modified form, the pipe being omitted; and FIG. 6 is a view like FIG. 1 showing an elongated coupling assembly that would be used to seal a relatively long split in the pipe.

FIG. 7 is a plan view of one side of one half of a modified form of coupling particularly intended for use on cast iron pipes;

FIG. 7a is a view like FIG. 7 showing a different form of axial gasket;

FIG. 8 is a section taken on 8—8 of FIG. 7.

Referring to FIGS. 1 to 4, a split coupling embodying the invention is indicated generally at C. In FIG. 1 it is shown both clamped and welded to a pipe P although the welding step is often omitted. The coupling is made of two major parts, a lower half A and an upper half B, each half having a semi-cylindrical body 10. In each end of this body, as seen in FIG. 3, is welded a semi-cylindrical ring 11. The rings project past the body and their ends are turned as at 12 to reduce their thickness to one close to that of the average pipe. This facilitates welding as at 12a to the pipe without burning the pipe. The rings 11 are formed with axially inner end faces 13 forming one wall of a recess for a gasket, as will be explained. The lower half of the coupling A has laterally extending clamp flanges 14 and the upper half has matching flanges 16. These flanges may be seam welded for a leak proof joint as at 15, after the parts are bolted together. The lower flanges 14 are drilled as at 17 to mount clamp bolts 18 welded thereto, as best seen in FIG. 2. The upper flanges 16 are drilled at 19 to receive the clamp bolts and the coupling halves are assembled and retained on the pipe by clamp nuts 21. In the welded type assembly the bolts are cut off and the ends seal welded as at 20, FIG. 1.

As mentioned previously, it is necessary to circumferentially seal both ends of the assembled clamp or coupling against axial leakage along the pipe. To this end each coupling half has a pair of circumferentially extending semi-circular packing or gasket members G. These are of rubber-like material and where fluid such as oil or the like is to be confined, they are formed of material that is impervious to such fluid, such as neoprene. Gaskets G fit in a circumferential recess formed by the body member 10, the axially inner face 13 of the associated outer end ring 11, and a semi-cyclindrical axially inner ring 22 welded to the interior of the body. The gaskets G project radially inwardly past the inner circumferential surfaces of the end rings 11 and confining rings 22. In this construction the space disposed axially between the confining rings 22 has a diameter substantially greater than that of the pipe so that welds or other irregularities in the pipe in this area will not interfere. Also the gaskets G can flow between rings 22 and the pipe walls as at 22a to augment the seal, as seen in FIG. 1.

In addition to sealing against flow of fluid along the pipe, provision is made to prevent flow of fluid between the coupling halves, that is, radially of the pipe along the interface. To accomplish this, each coupling half has a pair of axially extending thrust bars 23 along its edges, which bars, as seen in FIGS. 2 and 4, are not located at the interface but are spaced circumferentially inwardly therefrom. Resting along thrust bars 23 are axial gaskets G' for sealing at the interface between the coupling halves. These gaskets normally project past the interface so that when the coupling halves are assembled, as in FIGS. 2 and 4, they are firmly pressed together and deformed to effect a seal. Of course there is a tendency for the gaskets to elongate and so the ends of these gaskets abut the circumferential gaskets G (as seen in FIG. 4) at 24 to complete a seal here. The ends of the circumferential rings 22 abut the axial thrust bars 23 at zones 25 to insure inward confinement of the gaskets.

With the structure described so far, the circumferential gaskets are firmly pressed against the pipe when the coupling is assembled because the diameter of the pipe is greater than the internal diameter of the circumferential gaskets G. Even though high velocity fluid may be escaping when the clamp is assembled, the gaskets G remain in place because they are in the recess described. As the coupling parts are brought together radial flow of fluid presses the axial gaskets against the body 10 and the thrust bars 23 back up the gaskets and force them into sealing engagement with each other.

In the preferred embodiment of the invention I prefer to provide additional confining means for the gaskets. For the circumferential gaskets G, I provide a series of axially extending girdering strips 26 seam welded to rings 11 as at 27 and having lips 28 overlying part of the axial extent of the gaskets G. These strips may have a bend 29 imparted thereto to accommodate the normal difference in thickness between the gaskets and the rings 11. When the coupling halves are assembled with this construction the pipes first engage the girdering strips 26 and bend them inwardly, causing outward flow of the partially confined gasket material against the pipe in the zone not covered by the lips of the girdering. This presses and flows the gasket material into complete, tight sealing engagement with the pipe, and at the same time traps the gaskets against outward extrusion from fluid pressure, either during or after assembly.

I likewise provide girdering for the axial gaskets G'. To this end I apply axial girdering strips 31 to the thrust bars 23 by seam welds 32, these girdering strips again having lips indicated at 33 that partially overlie the radially inner faces of the axial gaskets G'. These strips tend to augment the seal between the interfaces of the gaskets when the parts are clamped together by engaging the wall of the pipe and forcing the gaskets to flow into firm sealing engagement. Girdering strips 31 are bent as at 34 to accommodate the extra thickness of the gaskets G' relative to the thrust bars 23. These axial girdering strips are bent outward slightly by engagement with the pipe to flow the gaskets into firm sealing engagement.

In the form of the invention shown in FIG. 5 the coupling C₁ is like that described except that I provide additional girdering 36 for the axial gaskets G'. These strips resemble girdering strips 31 except that they are welded to the flanges 14 and 16 of the coupling halves and their lips 38 partially overlie the interface portions of the gaskets G'. This girdering, which may be used either with or without the strips 31, produces sealing flow of the gaskets by contact with similar strips 36 on the other coupling half when the two halves are clamped together. This arrangement permits the axial packings to be spaced from the pipe wall, while insuring flow of the packings into sealing engagement, and also trapping them against outward extrusion from internal pressure.

The coupling of the invention can be fabricated in any desired length depending upon the nature of the joint to be sealed. FIG. 6 shows a five-section coupling C₂ fabricated to seal a relatively long split in the pipe.

I may reinforce the couplings if desired by circumferential ribs 41 and axial ribs 42 in case severely high pressures are expected. The coupling halves are designated A₁ and B₁.

The coupling may or may not be welded to the pipe depending upon the requirements in the field. The coupling may also be manufactured to join the ends of two pipes as well as to seal them, in which case radial clamping screws, such as those shown in my Patent No. 2,567,243, can be fitted to the body of the coupling by drilling and tapping the body, at circumferentially spaced points adjacent each end thereof axially outside of the circumferential gaskets G.

Instead of using the aforementioned radial clamping bolts I may use a pair of semi-circular pipe biting rings R disposed in grooves in each coupling part as seen in FIGS. 1 and 3, which rings have teeth R₁ that bite into the walls of the pipe ends when the latter tend to spread axially due to fluid pressure in the pipes. The use of these rings obviates the need for seal welding the ends of the radial clamping bolts when a welded assembly is employed.

The form of the invention shown in FIGS. 7a and 8 is somewhat different, and instead of being fabricated from steel parts, the coupling parts for coupling C₃ are made integral of cast iron or cast steel. This construction is useful when the coupling parts are used to repair a leak in the pipe and need not withstand axial forces that might be encountered when the coupling parts are used to join the two ends of the pipe.

Here, the interconfining ring for the gaskets G indicated at 22a is integral with the body 10a, as are the extensions 12b that extend past the flanges 14a. Only one half of a coupling appears in these figures. Both the forms of FIGS. 7 and 7a differ from those previously described in that there are gaskets 50 and 50a extending between the flanges, which gaskets may be of silicone-type rubber or of an asbestos composition. Gasket 50a, FIG. 7a, is notched as at 51 to clear the circumferential gasket G, whereas in FIG. 7, gasket 50 extends across the ends of gasket G. In either case, the flow of gaskets G upon assembly will bring their ends together and complete the seal between the coupling halves.

Since these forms are preferably castings, they can be cast and turned in their cylindrical shape and then cut apart and the width of the cut will be compensated for by the presence of one or more gaskets 50 or 50a.

The bolts 18a in this form, where the body is of cast iron, are preferably threaded into the flanges 14a of that section of the coupling that carries the bolts. The circumferential girdering structure 26 is preferably incorporated in these forms of the invention as previously described.

Thus it will be seen that I have provided a split coupling formed in two halves to surround the pipe which both seals around the pipe and between the coupling halves in a manner that is positive and prevents dislodgement of the packing due to mechanical action that might occur during assembly of the coupling, as well as forces caused by escaping fluid.

Although the foregoing description is necessarily of a detailed character, in order that the invention may be completely set forth, it is to be understood that modifications may be made without departing from the scope or spirit of the invention as herein claimed.

What is claimed is:

1. A split coupling for pipes comprising a pair of semi-cylindrical members, means to join said members into a single cylindrical unit to span the pipe, each of said members having semi-cylindrical internal circumferential gaskets adjacent the ends thereof to seal against endwise flow of fluid along the coupling and pipe assembly, and each of said members carrying longitudinally extending edge gaskets that normally project past the longitudinal edges of the members to seal against escape of fluid between the longitudinal edges of said semi-cylindrical members when they are joined together, each of said members having a body portion between said circumferential gaskets with an internal diameter greater than that of the pipe to be sealed, a pair of axially spaced, means defining semi-cylindrical internal recesses in each member disposed adjacent the outer ends of each body portion which receive said circumferential gaskets, the radial thickness of said circumferential gaskets exceeding the depth of said recesses, a series of flexible girdering strips joined to the inside of said members endwise beyond said circumferential gaskets and extending longitudinally inwardly partially across the inside of said circumferential gaskets, means at each longitudinal edge of each member defining a lengthwise recess which receives the respective edge gasket, each said lengthwise edge recess extending from one of said semi-cylindrical internal recesses to the other, longitudinally extending, flexible girdering strips joined to the respective members and extending partially across the radially inner face of the associated edge gasket, and axially extending girdering members extending partially across the outer face of the respective associated edge gasket.

2. A pipe coupling for spanning a pipe circumferentially, said coupling being divided along longitudinal edges into a plurality of coupling members, means for securing said coupling members together at said longitudinal edges into a single unit spanning the pipe circumferentially, said coupling having means forming internal circumferential shoulders and extending the full peripheral extent of the member at the axially outward ends of the members, a pair of axially spaced, deformable, arcuate gasket elements carried by each of said coupling members at the inside thereof and extending the full peripheral extent of the member at the axially inward ends of the shoulders, the corresponding arcuate gasket elements on the coupling members being aligned end to end with each other and forming two spaced internal circumferential gaskets at the inside of the coupling when said coupling members are secured together, flexible girdering means for each circumferential gasket, means permanently and rigidly securing said girdering means to said coupling axially outward from the respective circumferential gasket, said girdering means extending axially only partially across the latter's radially inward face and terminating short of the latter's axially inward edge and extending radially inwardly beyond the outer periphery of the pipe to be coupled, each shoulder and the respective girdering means confining the respective circumferential gasket at its axially outward end and leaving the axially inward extremity of said gasket exposed at its radially and axially inward face, each of said girdering means being so constructed and arranged as to be bendable radially outward by engagement with the outside of the pipe when said coupling members are secured together thereabout to deform said exposed extremity of the respective circumferential gasket into tight sealing engagement against the pipe and to trap said gasket against outward extrusion from fluid pressure in the pipe, longitudinal gasket means extending at the longitudinal edges of said coupling members between said circumferential gaskets and sealing the coupling at said longitudinal edges, and backing means to prevent blowout of said longitudinal gasket means.

3. The coupling of claim 2 wherein said girdering means are arcuate metal strips, each having circumferentially spaced longitudinal slots therein which are open at the axially inward end of the strip.

4. The coupling of claim 2, wherein each of said coupling members has a recess at the inside along each longitudinal edge between said arcuate gasket elements, a deformable longitudinal gasket element seated in each said recess and extending between said arcuate gasket elements, each of said longitudinal gasket elements having a radially and longitudinally extending sealing face which normally projects beyond the respective longitudinal edge of the respective coupling member, longitudinal girdering means rigidly secured to the inside of each coupling member adjacent each of said longitudinal recesses and extending only partially across the radially inward side of the corresponding longitudinal gasket element and terminating short of said sealing face on the latter, and a retainer for each longitudinal gasket element extending from the latter's radially outward side only partially across the latter's sealing face and terminating short of the radially inward side of the latter, leaving the respective longitudinal gasket element exposed at the radially inward extremity of its sealing face, each retainer being movable inward toward the corresponding recess when said coupling members are secured together to deform said exposed extremity of the respective longitudinal gasket element against the corresponding longitudinal gasket element on the adjoining coupling member.

References Cited in the file of this patent

UNITED STATES PATENTS

| | | |
|---|---|---|
| 918,858 | James et al. | Apr. 20, 1909 |
| 1,369,913 | Brunhoff | Mar. 1, 1921 |
| 1,568,268 | Clark et al. | Jan. 5, 1926 |
| 1,714,803 | Mueller | May 28, 1929 |
| 1,801,157 | Howard | Apr. 14, 1931 |
| 1,905,324 | Waters | Apr. 25, 1933 |
| 1,940,729 | Pfefferle | Dec. 26, 1933 |
| 2,286,751 | Merrill | June 16, 1942 |
| 2,567,243 | Smith | Sept. 11, 1951 |
| 2,676,037 | Mueller | Apr. 20, 1954 |

FOREIGN PATENTS

| | | |
|---|---|---|
| 532,925 | Canada | Nov. 13, 1956 |